Nov. 6, 1956     H. A. WHEELER     2,769,314
WINDOW MOUNTED REFRIGERATING APPARATUS
Filed April 1, 1955     2 Sheets-Sheet 1
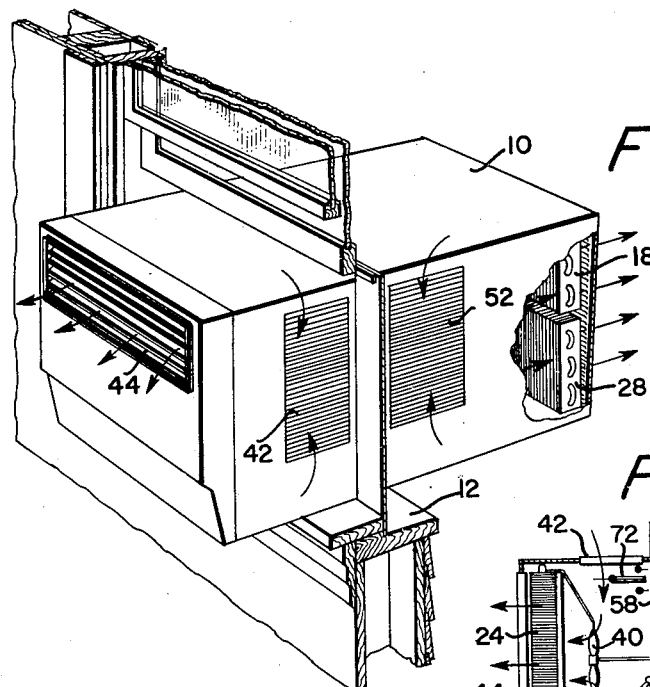
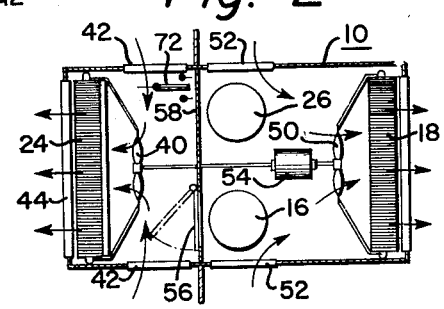
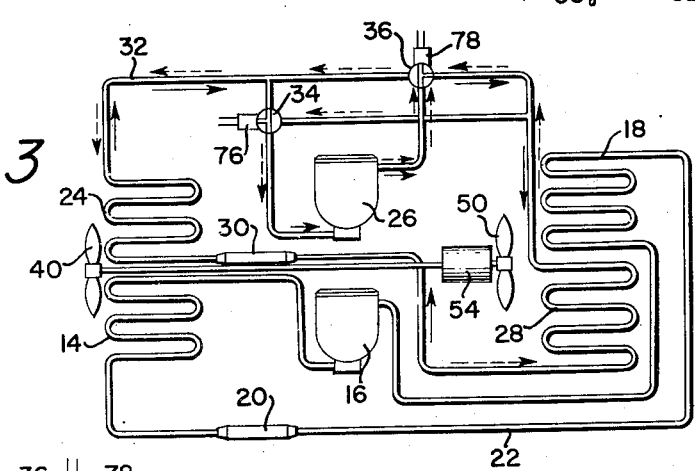
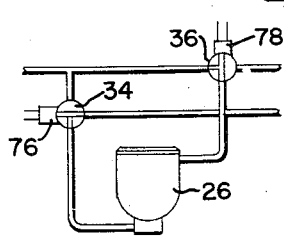
INVENTOR.
Harold A. Wheeler
BY R. R. Candor
His Attorney

| CONTROL SETTING | POSITIONS OF SWITCHES | | | |
|---|---|---|---|---|
| | Switch A | Switch B | Switch C | Switch D |
| OFF | OFF | OFF | OFF | OFF |
| HEAT | ON | OFF | OFF | ON |
| VENTILATION | ON | OFF | OFF | OFF |
| LOW COOLING | ON | ON | OFF | OFF |
| HIGH COOLING | ON | ON | ON | OFF |
| DEHUMIDIFICATION | ON | OFF | ON | ON |

INVENTOR.
Harold A. Wheeler
BY R. R. Candor
His Attorney

United States Patent Office 2,769,314
Patented Nov. 6, 1956

2,769,314

WINDOW MOUNTED REFRIGERATING APPARATUS

Harold A. Wheeler, Dayton, Ohio, assignor to General Motors Corporation, Detroit, Mich., a corporation of Delaware Application April 1, 1955, Serial No. 498,552

4 Claims. (Cl. 62—6)

This invention relates to refrigerating apparatus and more particularly to window mounted air conditioning units and the like.

It is an object of this invention to provide an air conditioning unit which may be used for either heating, cooling, or dehumidifying the air to be conditioned. Another object of this invention is to provide a window mounted air conditioning unit with two separate refrigerating systems which may be controlled individually and wherein the one system may have its cycle reversed.

It is another object of this invention to provide a dual air conditioning system in which a thermostat automatically controls the operation of the reverse cycle unit so as to provide the particular air conditioning effects required at any given time.

More particularly, it is an object of this invention to provide a dual refrigerating system in a window or the like wherein the air to be conditioned may be heated by the one system while the other system remains idle or is used for dehumidifying the air and wherein one or both systems may be used for cooling the air.

Further objects and advantages of the present invention will be apparent from the following description, reference being had to the accompanying drawings, wherein a preferred form of the present invention is clearly shown.

In the drawing:

Figure 1 is a perspective view showing my invention applied to a window type air conditioning unit;

Figure 2 is a plan view with the top broken away showing somewhat schematically the arrangement of the main parts within the main casing;

Figures 5, 6:
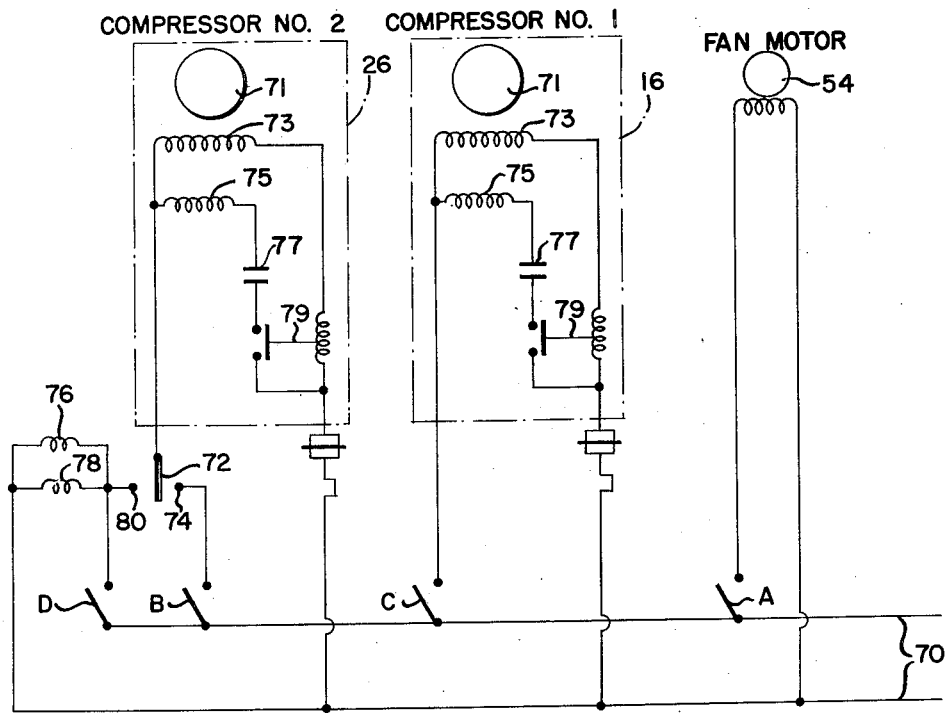

Figure 3 schematically shows the refrigerant circuits;

Figure 4 is a fragmentary view showing the setting of the valves during heating or dehumidifying;

Figure 5 is a circuit diagram showing the electric controls; and

Figure 6 is a chart showing the positions of the various control switches for accomplishing the results indicated therein.

While this invention is primarily intended for use in a window air conditioning unit, it is obvious that certain aspects of the invention are equally applicable to other types of air conditioning systems. Referring now to the drawing wherein a preferred embodiment of the invention has been shown, reference numeral 10 generally designates a main housing which is adapted to be mounted on the window sill 12 of a room to be conditioned whereby the one portion of the unit projects into the outside atmosphere and another portion of the unit projects into the space to be conditioned.

Two separate air conditioning systems are mounted in the cabinet 10 and these systems cooperate with one another to condition air so as to either provide heating, low cooling, high cooling, or dehumidifying. The one refrigerating system includes an evaporator 14, a conventional sealed motor compressor unit 16, a condenser 18, and a fixed restrictor 20 which are connected into series refrigerant flow relationship as shown in Figure 3 by means of suitable conduits generally designated by the reference numeral 22. This one system is a conventional refrigerating system of the simplest type which serves to cool the room air circulated over the evaporator 14 when called upon to do so and to dissipate any heat removed from the room air into the outside atmosphere through the condenser 18.

A second refrigerating system of the reverse cycle type is also mounted within the cabinet 10 and includes a first heat exchange unit 24 arranged to contact the room air, a conventional sealed motor compressor unit 26, a heat exchange coil 28 arranged to contact the outside air and a fixed restrictor 30. The heat exchange units 24 and 28 are connected in series refrigerant flow relationship with the fixed restrictor 30 and the motor compressor unit 26 by means of refrigerant lines generally designated by the reference numeral 32.

Three-way valves 34 and 36 are provided as shown for reversing the flow of refrigerant through the heat exchangers 24 and 28.

These valves are of the solenoid operated type and normally occupy the position shown in Figure 3 of the drawing when the operating solenoids 76 and 78 are de-energized so as to cause the refrigerant to flow through the refrigerant lines 32 in the direction indicated by the solid line arrows whenever cooling is desired. Energization of the solenoids 76 and 78 serves to redirect the flow of refrigerant through the refrigerant lines so as to cause the refrigerant to flow in the direction indicated by the dotted line arrows whenever it is desired to heat the air flowing over the heat exchange coil 24.

As shown in Figures 2 and 3, a first fan 40 serves to circulate air to be conditioned over the evaporator 14 and the heat exchanger 24. The air to be conditioned enters cabinet through suitable side air inlets 42 and is discharged through the front air outlet 44 after having passed in thermal exchange relationship with the evaporator 14 and the heat exchanger 24. As best shown in Figure 3 of the drawing, the heat exchanger 24 is located above the evaporator 14 with the result that half of the air to be conditioned passes over the heat exchanger 24 and the other half of the air to be conditioned passes over the evaporator 14. By placing the heat exchanger 24 above the evaporator 14, it is possible to condense moisture on the evaporator 14 without any of the condensate dripping down onto the heat exchanger 24. It will also be noted that the heat exchanger 28 which at times serves as an evaporator is located beneath the condenser coil 18 so as to prevent any of the condensate which might form on the coil 28 from dripping directly onto the condenser 18. Any conventional condensate collecting and dissipating means may be used.

A fan 50 is provided for forcefully circulating outside air over the condenser 18 and the heat exchanger 28. As best shown in Figure 2 of the drawing, the air circulated by the fan 50 enters the cabinet through the side air inlets 52 and is discharged outwardly over the condenser 18 and the heat exchanger 28 in accordance with conventional practice. The fans 40 and 50 have been shown as mounted on opposite ends of the shaft of a fan motor 54 where it is obvious that a separate motor could be provided for each of the fans if desired.

The two refrigerating systems are individually controllable so that either one or both may be used for treating the room air or if desired both systems can be shut off and the fans used for ventilating purposes. Fresh air for ventilating purposes may be introduced into the evaporator compartment by any suitable means such as the fresh air damper 56 located in the partition 58 which separates the main housing 10 into two separate portions in accordance with usual practice.

The operation of the refrigerating systems and the fan motor may be controlled manually by means of the circuit and switch arrangement shown in Figure 4 or they may be controlled by means of a single control dial (not shown) operating conventional control cams (not shown) which would actuate the various switches in accordance with well known practice. Each motor compressor unit is of conventional construction and includes a rotor 71, a main winding 73, starter winding 75, condenser 77, and starter winding control relay 79.

Referring to Figure 4 of the drawing, it will be noted that the fan motor 54 is connected across the main power lines 70 by means of a switch designated by the reference character A. The compressor 16 for the first refrigerating system is connected across the main power lines by means of a switch C and the compressor 26 of the second system is connected across the main power line 70 by means of a switch B which is arranged in series with a thermostat 72. The construction and arrangement of the thermostat 72 is such that whenever the switch B is closed and the thermostat 72 indicates that cooling is required, the thermostat 72 will move into engagement with contact 74 so as to energize the compressor 26. When the switches A, B, and C are all closed, both refrigerating systems will serve to cool the room air and the compressor 16 will operate continuously, but the compressor 26 will only operate when the thermostat 72 calls for cooling.

Whenever it is desired to merely dehumidify the air, the switches A, C, and D are moved to their closed positions. Closing of the switch D energizes the solenoids 76 and 78 which control the three-way valves 34 and 36 respectively whereby the second refrigerating system is set to function as a heater for the room air circulated over the heat exchanger 24 whenever the theromstat 72 calls for heating. When the switches A, C, and D are set for dehumidifying the air the evaporator 14 cools and dehumidifies one half of the room air stream at all times regardless of the room temperature whereas the heat exchanger 24 heats the other half of the room air stream only at lower air temperatures.

Whenever it is desired to utilize the air conditioning unit for heating the air, the switches A and D are closed and the switches B and C opened. With the switches A and D closed, the fan motor 54 is energized to operate continuously, the heat exchanger 24 functions as a condenser for heating the room air, and the compressor 26 is controlled by the thermostat 72 so as to start and stop the heating operation. Thus, upon a predetermined decrease in the temperature within the conditioned space the thermostat 72 will move into engagement with the stationary contact 80 so as to cause heating until the heating demand has been satisfied at which time the thermostat 72 will open the circuit to the compressor 26.

The thermostat 72 may be located in any convenient location where it will be responsive to the temperature of the air in the room to be conditioned. Thus, it may be located directly in the room to be conditioned or may be located directly in the return air stream within the housing 10 as shown in Figure 2.

While the form of embodiment of the invention as herein disclosed constitutes a preferred form, it is to be understood that other forms might be adopted, as may come within the scope of the claims which follow.

What is claimed is as follows:

1. In an air conditioning unit of the type adapted to be mounted in a window with one portion of the unit communicating with a room to be conditioned and another portion communicating with the outside atmosphere, a main housing, means separating said housing into a first compartment for conditioning air for said room and a second compartment arranged in thermal exchange relationship with the outside air, a first refrigerating system having an evaporator located in said first compartment and having a refrigerant liquefying means located in said second compartment, a second refrigerating system having a first heat exchange coil in said first compartment and a second heat exchange coil in said second compartment, said second system including refrigerant translating means and refrigerant flow directing means whereby said second system may be used for selectively absorbing heat from air in either one of said heat exchange coils and dissipating the heat in the other of said heat exchange coils.

2. In an air conditioning unit of the type adapted to be mounted in a window with one portion of the unit communicating with a room to be conditioned and another portion communicating with the outside atmosphere, a main housing, means separating said housing into a first compartment for conditioning air for said room and a second compartment arranged in thermal exchange relationship with the outside air, a first refrigerating system having an evaporator located in said first compartment and having a refrigerant liquefying means located in said second compartment, a second refrigerating system having a first heat exchange coil in said first compartment and a second heat exchange coil in said second compartment, said second system including refrigerant translating means and refrigerant flow directly means whereby said second system may be used for selectively absorbing heat from air in either one of said heat exchange coils and dissipating the heat in the other of said heat exchange coils and means for individually controlling said first system and said second system whereby one or both may operate at any given time.

3. In an air conditioning unit of the type adapted to be mounted in a window with one portion of the unit projecting into a room to be conditioned and another portion projecting into the outside atmosphere, a housing, means separating said housing into a first compartment for conditioning air for said room and a second compartment arranged in thermal exchange relationship with the outside air, a first refrigerating system including an evaporator located in said first compartment and refrigerant liquefying means including a condenser located in said second compartment, a second refrigerating system having a first heat exchange coil in said first compartment and a second heat exchange coil in said second compartment, said second system including a refrigerant translating means and means for reversing the flow through said heat exchange coils for selectively absorbing heat from air in one of said heat exchange coils and dissipating the heat in the other of said heat exchange coils, first fan means for circulating air to be conditioned simultaneously over said evaporator and said first heat exchange coil, second fan means for circulating outside air simultaneously in thermal exchange relationship with said condenser and said second heat exchanger coil.

4. In an air conditioning unit of the type adapted to be mounted in a window with one portion of the unit projecting into the room and another portion projecting into the outside atmosphere, a housing, means separating said housing into first compartment for conditioning air for said room and a second compartment arranged in thermal exchange relationship with the outside air, a first refrigerating system including an evaporator located in said first compartment and refrigerant liquefying means located in said second compartment, a second refrigerating system of the reverse cycle type having a first heat exchange coil in said first compartment and a second heat exchange coil in said second compartment, means for selectively absorbing heat from air in one of said heat exchange coils and for dissipating the heat in the other of said heat exchange coils, means responsive to the temperature of the air to be conditioned for controlling the operation of said second refrigerating system.

References Cited in the file of this patent
UNITED STATES PATENTS

| | | |
|---|---|---|
| 2,071,178 | Roessler | Feb. 16, 1937 |
| 2,155,484 | Gottlieb | Apr. 25, 1939 |
| 2,654,227 | Muffly | Oct. 6, 1953 |
| 2,692,481 | Schweller | Oct. 26, 1954 |